United States Patent [19]

Gower

[11] Patent Number: 4,992,320

[45] Date of Patent: Feb. 12, 1991

[54] LAMINATES FOR HEADLINING

[75] Inventor: Michael W. Gower, Durban, South Africa

[73] Assignee: Courtaulds Automotive Products (SA) (Pty.) Limited, Durban, South Africa

[21] Appl. No.: 276,192

[22] Filed: Nov. 23, 1988

[51] Int. Cl.$^5$ .......................... B32B 3/28; B60J 10/00
[52] U.S. Cl. ...................................... 428/184; 428/68; 428/72; 428/124; 428/127; 428/179; 428/186; 428/192; 428/246; 428/252; 428/282; 428/318.8; 296/211; 296/214; 181/290; 181/291
[58] Field of Search ............... 428/174, 178, 182, 179, 428/186, 219, 220, 192, 253, 287, 563, 184, 913.3, 252, 286, 319.3, 368.8, 913, 68, 72, 76, 246, 247, 260, 282, 121, 124, 127, 126, 128; 296/210, 211, 213, 214; 181/288, 286, 284, 290-294

[56] References Cited

U.S. PATENT DOCUMENTS

| | | | |
|---|---|---|---|
| 2,091,918 | 8/1937 | Finck | 428/182 |
| 4,119,749 | 10/1978 | Roth et al. | 296/210 |
| 4,128,677 | 12/1978 | Hoelzinger | 428/184 |
| 4,131,702 | 12/1978 | Alfter et al. | 296/214 |
| 4,150,850 | 4/1979 | Doerfling | 428/182 |
| 4,657,611 | 4/1987 | Guius | 428/184 |

Primary Examiner—Ellis P. Robinson
Assistant Examiner—Donald J. Loney
Attorney, Agent, or Firm—John J. Kowalik

[57] ABSTRACT

A headlining laminate (10) is made up of a composite which includes two corrugated boards having corrugations which are arranged at right angles to each other and having a thermoplastic sheet interposed between the boards for adhesion. The board is covered with a fabric (15) and includes mounting holes. An advantage of the invention is that stretch lines do not occur on the fabric due to the corrugations of the board being at an angle to each other.

2 Claims, 2 Drawing Sheets

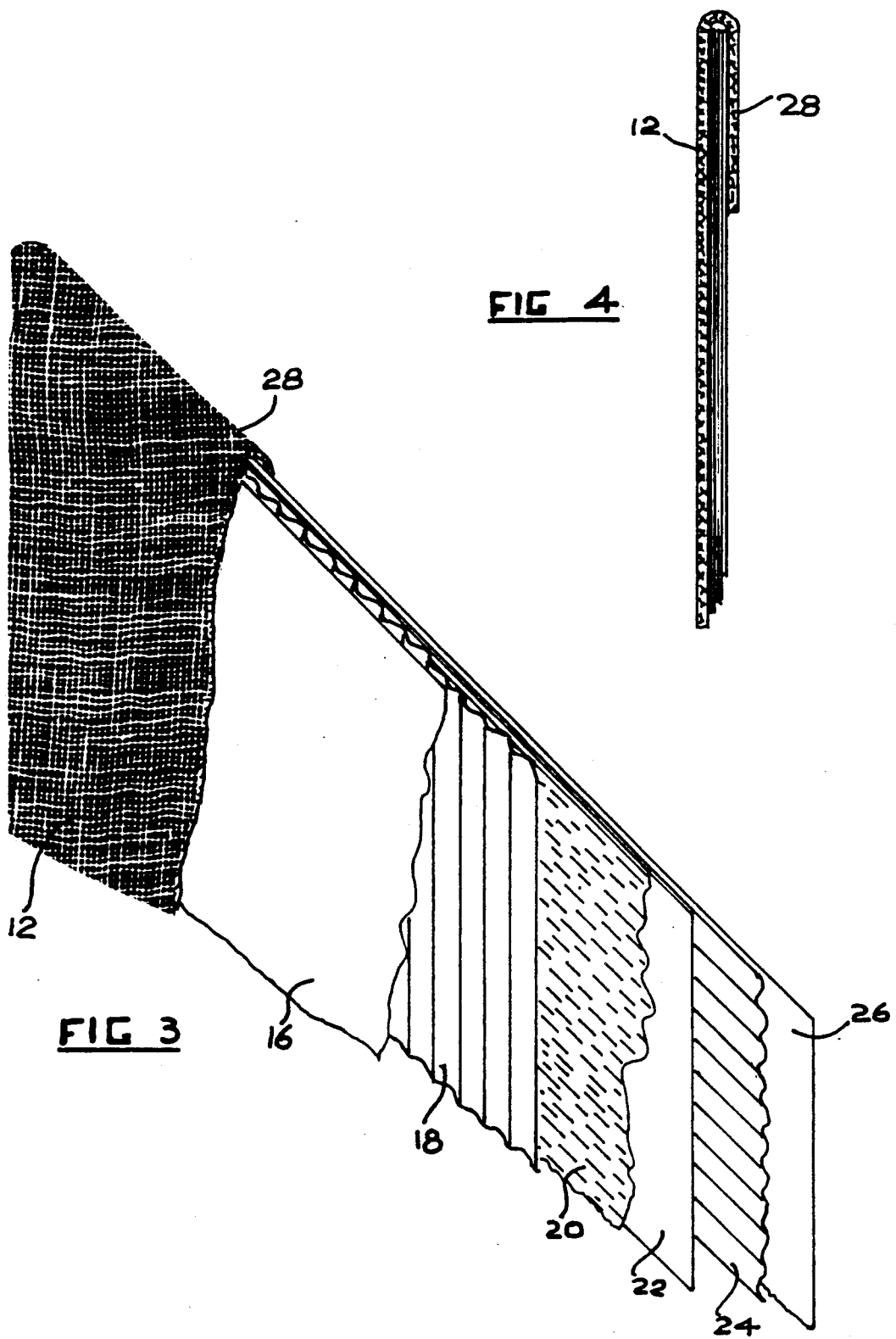

LAMIANTES FOR HEADLINING

FIELD OF THE INVENTION

This invention relates to laminates primarily for headlining for use, for example for automobiles, boats, trains, aircraft and the like, but which is also useful in many other applications, such as panelling, linings, structures and the like.

BACKGROUND OF THE INVENTION

Conventional moulded headliners utilise felt, glass fibre, polystyrene/polyurethane and paper board constructions reinforced with polymeric substances as the structural backing material. Experience has highlighted certain disadvantages with most of the systems currently in use. In recent years many automotive manufacturers have turned to the use of corrugated board and in particular to a laminate comprising liner boards top and bottom of a corrugated sheet. The liner boards may be joined to the corrugated board by way of a thermoplastic resin such as polyethylene which is used in its plastic state to weld the boards together.

Such a product is subject to the disadvantage of formation of stretch lines caused by relative movement of the boards within the headlining due to heat.

It is an object of the present invention to minimise or even to eliminate this disadvantage.

THE INVENTION

According to the invention a panel comprises a laminate including liner boards and at least two corrugated boards, with their corrugations at an angle to one another.

In a preferred form of the invention the corrugations of one corrugated board are at right angles to those of another corrugated board, but it will be appreciated that depending on the desired strength of board, the angle between the corrugations of one board and the corrugations of an associated board may vary. For example, the angle may be 60 degrees.

Sheets of thermoplastic polymeric material are interposed between resin impregnated or glue starched boards to form a weld between adjacent boards when heated to the correct temperature.

The laminate of the invention is preferably formed as a headlining and does not suffer from the disadvantage referred to above.

The laminate of the invention may be covered with a fabric and in a preferred form of the invention the fabric overlaps the edges of the laminate and is secured in such overlapping relationship.

EMBODIMENT OF THE INVENTION

An embodiment of the invention is illustrated in the accompanying drawings in which:

FIG. 3 is a similar view to FIG. 2 showing a fabric covering which overlaps the edges; and FIG. 4 is a partial cross sectional side view on the line 4—4 of FIG. 3.

Figure 1:
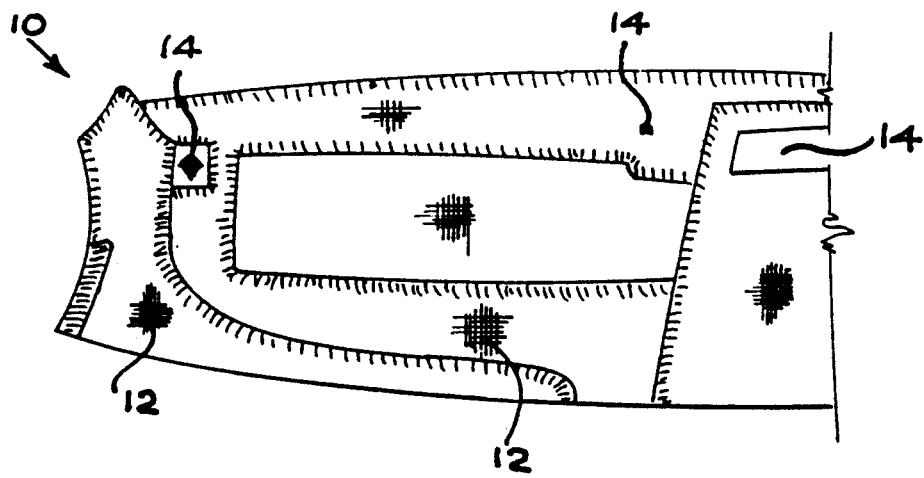
FIG. 1 shows a portion of a headlining according to the invention.

Referring to the drawings, a headlining laminate 10 includes suitable holes 12,14 for fitting to the roof of an automobile.

Figure 2:
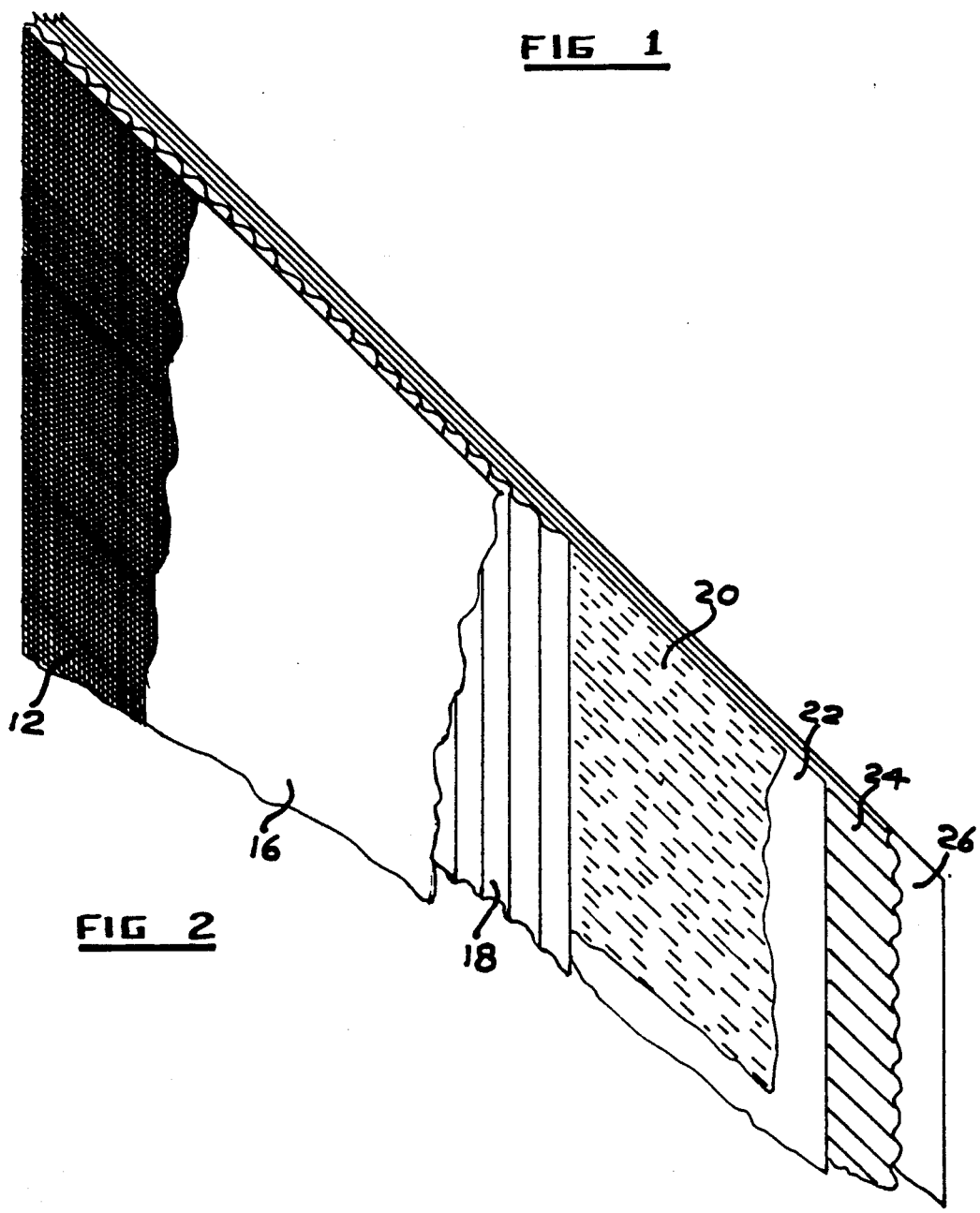
FIG. 2 is a sectional view of a lining, stripped for descriptive and illustrative purposes.

Turning to FIG. 2, the the laminate 10 is a composite comprised of a fabric 15 followed by a liner board 16, a corrugated board 18 with its corrugations extending in one direction, a sheet 20 of thermoplastic material resin or the like depending on the final quality required (low density polyethylene by preference), a liner sheet 22, a second corrugated board 24 with its corrugations at right angles to those of the board 18, and a final liner board 26. The liner board 26 may also be treated with resin or the like. The angle between the corrugations may be different from a right angle. All the boards used in the laminate comprise cardboards.

The laminate is formed by heating in a shaped die, the thermoplastic material becoming plastic and acting as an adhesive.

The laminate of the invention adapts well to shaping using heated dies and retains its shape excellently. By virtue of the corrugations at an angle to each other, the problem of stretch lines does not occur even in the most extreme heat conditions encountered. The various parts of the laminate are able to expand and contract without the formation of stretch lines.

In FIGS. 3 and 4 the fabric 15 overlaps the edges, as shown at 28 and is secured by gluing or the like in that overlapped relationship.

I claim:

1. A panel for lining the inside of automobile roofs comprising a laminate which includes a pair of resin-impregnated corrugated cardboard boards with their corrugations at an angle to one another, said boards being heat bonded together by a sheet of thermoplastic material interposed there between, and a fabric lamina covering said laminate.

2. The panel as claimed in claim 1, and said boards terminating in edges, and said fabric lamina overlapping the edges and being secured in such overlapping relationship.

* * * * *